Dec. 12, 1939. C. R. HANNA Re. 21,293

SOUND RECORDING AND REPRODUCING SYSTEM

Original Filed Nov. 23, 1928

INVENTOR
Clinton R. Hanna

BY Wesley G. Carr
ATTORNEY

Reissued Dec. 12, 1939

Re. 21,293

UNITED STATES PATENT OFFICE 21,293

SOUND RECORDING AND REPRODUCING SYSTEM

Clinton R. Hanna, Wilkinsburg, Pa., assignor to Westinghouse Electric & Manufacturing Company, a corporation of Pennsylvania Original No. 1,888,724, dated November 22, 1932, Serial No. 321,365, November 23, 1928. Application for reissue November 21, 1934, Serial No. 754,197

37 Claims. (Cl. 179—100.3)

The invention relates to methods of and means for recording and reproducing sound and particularly to photographic methods and means for this purpose in which the intensity of the sound is represented by variations in the amount of light delivered to the record.

All sound-recording-and-reproducing devices introduce more or less extraneous noises, including ground tones. When the sound to be recorded is fainter than that to which the apparatus is ordinarily adjusted, as, for example, when it is a diminuendo passage in music, the distinction between the sound and the ground tone is less, and the satisfactory recording and reproduction of such sounds is thereby rendered difficult.

It is an object of my invention to provide a means for satisfactorily recording and reproducing sounds, even when the program includes both loud sounds and faint sounds.

It is a further object of my invention to provide a variable degree of amplification between the sound-responsive device and the recording instrument, whereby a greater degree of amplification may be utilized for faint sounds.

It is a further object of my invention to provide a feature in the record by means of which the degree of amplification utilized in reproduction may be so controlled that sounds which were recorded with a high degree of amplification may be reproduced with a small degree of amplification.

It is a further object of my invention to provide automatic means whereby the degree of amplification between the microphone and the recorder may be made to correspond to the average intensity of the sound and also automatic means whereby the degree of amplification between the record-controlled device and the sound-producing device may be automatically adjusted in accordance with the above-mentioned feature of the record.

It is a further object of my invention to provide means whereby the average degree of darkening of the negative may be controlled in accordance with the average intensity of the sound. The excess or deficiency of darkening, at any point of the record, corresponding to the momentary sound pressure, will, in the case of the area type of record, be manifest as peaks or valleys at one edge of the darkened area.

In the case of a photographic record of the type in which not area but density varies with the sound, the momentary changes corresponding to instantaneous sound values will be manifest as bands or lines across the record, denser or thinner than the average. In a negative of this type, the average density changes as the average width of the darkened area changes in the record of the first-described type.

Changes in the degree of darkening, whether they are changes of density or of area of the darkened portion, can represent the sound values, and the average darkening can represent the average intensity of the sound in either type of record.

Obviously, both the average character and the variations from point to point in the negative are represented by corresponding opposite characteristics in the positive. Where the average darkening of the negative is greatest, the positive will show a greater average degree of clearness. In the case of the area-type of record, this means that the clear area in the positive will be greater at such places. In the case of the variable-density type of record, this means that the positive will, on the average, be more transparent there.

It is a further object of my invention to so correlate the change in average darkening with the change in amplification that the individual maxima of darkening will be of a more nearly constant value.

It is a further object of my invention to provide a means whereby the average value of the rectified current from a microphone may be indicated by a bias upon the grid of the first amplifier tube.

It is a further object of my invention to provide means whereby the average degree of illumination of a photo-electric cell shall control the average potential of the grid of a vacuum tube.

My invention will be better understood by reference to the following detailed description and the accompanying drawing, in which.

Figure 1:
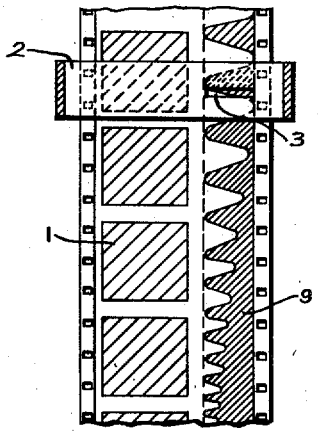
Figure 1 is a view, partially in section and partially diagrammatic, of a portion of the negative of a photographic sound record.

In the negative shown in Fig. 1, the frames 1 represent the pictures of an ordinary moving picture record. The rectangle 2 represents the guide through which the record must pass while recording sound. The window 3, which is shown in Fig. 3, also represents a slit through which the record is illuminated to a greater or less extent, corresponding to the sound.

Figure 2:
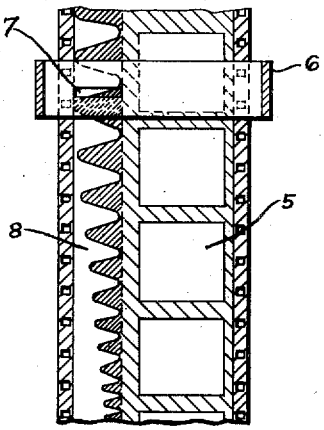
Fig. 2 is a similar view of a positive corresponding to the negative in Fig. 1.

The positive record shown in Fig. 2 comprises corresponding parts, including the rectangular pictures 5. A gate 6 and a window 7 cooperate with the sound record 8. The sound record 8, represented by the clear area in Fig. 2, corresponds to the darkened area in the negative represented by the shaded area 9 in Fig. 1.

Figure 3:
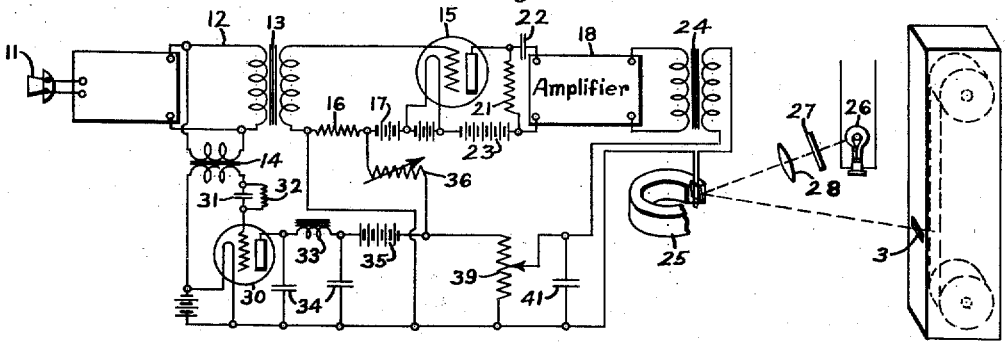
Fig. 3 is a diagram of the circuits and apparatus used in the recording system.

In the apparatus shown in Fig. 3, a microphone 11 supplies current in the output circuit 12 which includes the primary of a transformer 13 and the primary of a transformer 14 in parallel thereto.

The secondary of the transformer 13 is connected to the grid of a vacuum tube 15 and, through a resistor 16 and a biasing battery 17, to the filament of the same tube. The tube 15 is connected to an amplifier 18, the connection being of a character which causes the tube 15 to amplify to a degree determined by the average potential upon its grid. One well-known circuit for producing this result is illustrated. It includes a resistor 21 in the plate circuit of the tube 15 and a condenser 22 by means of which the end of said resistor nearest the anode of the tube is connected to the input of the amplifier 18.

The usual plate battery 23 is inserted, at any desired point, in the plate circuit. If placed, as shown, at the filament end of the resistor 21, the same plate battery may also serve as the B-battery for the amplifier 18.

The output of the amplifier 18 is connected, preferably through a transformer 24, to the vibrating element of an oscillograph 25. A light source 26, with which are associated a diaphragm 27 and an optical system, represented by the lens 28, illuminates the mirror of the oscillograph. The light reflected from the mirror is received upon the slit 3 and illuminates more or less of the film, according to the position of the mirror. The diaphragm 27 is preferably made to present a sharp straight edge to the light in order that the edge of the sound record made upon the film shall be definite.

The transformer 14 supplies the input of a vacuum tube 30 which is equipped with a grid condenser 31 and grid leak 32, causing the tube 30 to act as a rectifier. A low-pass filter is inserted in the plate circuit of the tube 30. This filter includes an inductor 33 and a pair of condensers 34. The B-battery 35 is shown as outside of this filter but it may be inserted at any convenient point in the plate circuit.

The resistor 16 is connected across the plate circuit of the tube 30 outside of the filter. If desired, an adjustable resistor 36 may be included in the shunt connection. The resistor 39 of a potentiometer is connected in parallel to the resistors 16 and 36. Between the slider of the potentiometer and one end thereof, a condenser 41 is connected. The output circuit of the potentiometer is connected to the secondary of the transformer 24 in series with the oscillograph 25. The condenser 41, the transformer secondary and the vibrator of the oscillograph thus form a circuit which, preferably, is of small impedance to currents of audio frequency.

Figure 4:
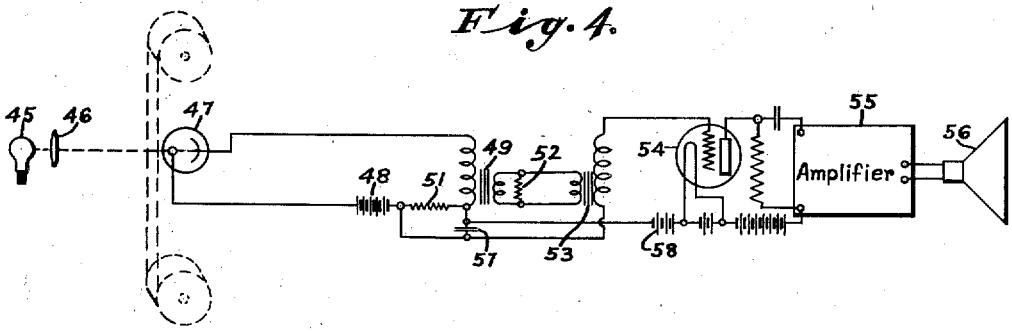
Fig. 4 is a diagram of the circuits and apparatus used in the reproducing system.

In Fig. 4, the light source 45 is concentrated by any suitable optical system, represented by the lens 46, upon a sound record which is made by printing a positive, like that shown in Fig. 2, from a negative, like that shown in Fig. 1. The light which traverses the sound record is received in a photo-cell 47 which is supplied with current from a battery 48. The circuit of the battery 48 includes the primary of a transformer 49, a resistor 51 and the photo-cell 47 in series.

A resistor 52 is connected across the secondary of the transformer 49 in a loop circuit which includes the primary of a transformer 53, through which the link circuit is connected to the grid circuit of a vacuum tube 54, connected to an amplifier 55, preferably in the same way as the tube 15 to its amplifier 18. The output of the amplifier 55 supplies a loud speaker 56 or other sound-reproducing device.

In shunt to the resistor 51 is a condenser 57 which is connected to the grid and filament of the tube 54. A C-battery 58 is included in the connection to provide a bias upon the grid of the tube 54.

In the operation of the device, the sound to be recorded is received upon the microphone 11. Currents produced thereby in the circuit 12 are transmitted by the transformer 13 to the grid and filament of the tube 15 and amplified thereby to a degree determined by the average potential upon the grid 15.

Currents in the circuit 12 produce varying potentials upon the grid of the rectifier tube 30. Because of the condenser 31 and the resistor 32, the changing potentials cause a charge to accumulate upon the grid of the tube 30 and thus vary its potential in a way which corresponds to the average value of the amplitude of the changing potentials.

This action is well understood, being strictly analogous to the action of the usual grid-condenser—grid-leak type of detector. The difference, however, is that the oscillations in the potential are much slower than in the usual detector tube because the input from the circuit 12 is of audio frequency.

The detector or rectifier tube 30 delivers a current to its output circuit which has a very small audio-frequency component and the main compound of which varies in accordance with the average intensity of the sound at the microphone 11. In order that momentary abrupt changes of intensity or the instantaneous changes, corresponding to the sound pressure, shall not produce corresponding abrupt current changes in the output of the tube 30, the filter 33—34 is provided. Preferably, this filter is of a low-pass type, greatly attenuating audo frequencies.

Frequencies of the order of one or two cycles per second, or even as low as a cycle in one or two seconds are transmitted by the filter and produce corresponding changes in the current in the resistors 16 and 39. The correct division of the current between these two resistors may be adjusted by adjusting the resistor 36. A further adjustment of the relation between the effect, at the oscillograph, of the steady or slowly-changing current through the resistor 16 and of the potential changes at audio-frequency transmitted by the transformer 13 is obtained by adjustment of the potentiometer 39.

When the current through the resistors 16 and 36 increases, the potential drop across the resistor 16 increases. The left-hand end of the resistor 16, therefore, becomes more negative, the impedance of the tube 15 increases, the proportion of all the impedance in the circuit of the battery 23 to the impedance of the resistor 21, therefore, increases, and the potential changes delivered across the condenser 22 are, therefore, of smaller amplitude.

It will thus be seen that a change in the average potential across the resistor 16 results in a change in the average amplification performed in the tube 15. If this change, as the apparatus is first set up, is in the opposite direction to that desired, a reversal of the connections from the tube 30 to the ends of the resistor 16 will reverse the direction of change in the degree of amplification.

Faint sounds produce small changes upon the grid of the tube 30, causing only a small negative charge to accumulate thereon and so diminish the current in the plate circuit of the tube 30 only slightly from the value thereof corresponding to silence. Loud sounds produce large changes of potential upon the grid 30 and, consequently, diminish the current through the resistor 16 by a large amount. Therefore, faint sounds result in a high degree of amplification, and loud sounds are amplified to a smaller degree.

The peaks in the record 8, corresponding to faint sound, are shown in the lower part of Fig. 2 as of small height, but they are of relatively greater height than would be the case if it were not for the change in amplification just described.

Similarly, at the top of Fig. 2, the peaks are shown as of greater height, to represent the louder sounds, but they are not of as great a relative height as they would be if the amplification corresponding to loud sounds were not diminished as explained.

In addition to the change in amplification, there is a change in the zero point from which the waves in the record begin. This is accomplished by the steady current through the output of the potentiometer 39. The potentiometer delivers a steady current through the oscillograph 25 which is superposed upon the audio-frequency current introduced through the transformer 24. The effect of the steady current through the oscillograph is to permanently deflect the mirror and thus bring at least a portion of the slit 3 into the region of permanent illumination, or if the permanent deflection be in the opposite direction, a region of permanent darkness. I have called this shift of the base line permanent in order to distinguish it from the changes taking place at audio frequency. Actually, it may change every few seconds or even a few times per second.

The combined effect of the steady and the audio-frequency currents is preferably sufficient to cause the maximum which the length of the illuminated portion of the slit 3 attains during each swing of the mirror to be substantially a constant. Obviously, this ideal is not reached in actual practice, because, in addition to the change in amplitude during a crescendo or diminuendo passage, there are, in any program, momentary louder sounds and moments of silence which are not removed by the slow correcting action of the tube 30.

It is not desirable that they should be removed. The reproduction ought to give these effects with the others. The straight line along the top of the dark peaks in Fig. 1, or the top of the light-colored peaks in Fig. 2, represents this characteristic of the record of a sound of gradually changing intensity, unaccompanied by any sudden changes to louder or fainter sounds.

The film, having been exposed in the apparatus shown in Fig. 3, is developed and printed, thus producing a record like that shown in Fig. 2. Such record is then used in an apparatus like that shown in Fig. 4.

When a portion of the record film corresponding to loud sounds, for example, that in the upper part of Fig. 2 is passing in front of the optical system 46, the photo-cell 47 is illuminated only by the passage of the peaks in front of the slit. There is no area unbroken by valleys passing before the slit. Therefore, the cell is only moderately illuminated.

The average current through the circuit of the battery 48 is, therefore, small, the potential across the resistor 51 is small and the grid of the tube 54 is, therefore, less negative than under average conditions. When the grid is less negative, the amplification is greater. Therefore, the sounds which are recorded with a relatively small amplification when exposing the film are reproduced with a relatively large amplification.

The sound record represented near the bottom of Fig. 2, which corresponds to the record of faint sounds, presents a relatively wide band of clear film. It, therefore, causes the photo-cell 47 to be illuminated strongly. This results in a more negative grid at the tube 54 and, therefore, a small degree of amplification. Thus, the sounds which were recorded with a large degree of amplification are reproduced with a small degree of amplification. For this reason, the sounds are not over-emphasized in the reproduced program but appear as faint sounds.

It will be seen that the effect of ground tone, whether due to film noises or to noises in the amplifiers, is largely avoided by this procedure. Loud sounds may be recorded upon the film, without difficulty from ground tone because the latter is negligible, as compared with them. Faint sounds, having been amplified to a greater degree, are then large, as compared with the ground tone. The record ground tone will, therefore, not interfere with the reproduction of the amplified sounds. When reproducing from the record, a high degree of amplification is not employed, even for the faint sounds, and, therefore, any danger of magnifying the ground tone, even when reproducing faint sounds, is avoided.

The means described for impressing a slowly changing potential upon the grid of the tube 15 in the recording device or upon the grid of the tube 54 in the reproducing device are automatic. Obviously manual adjustments guided either by ammeter readings or by the operator's estimate of the average loudness may be made to give the same results.

By reversing the connections from the grid and filament to the resistor either at the tube 15 or the tube 54, the negative, instead of the positive, may be used for reproduction.

The system, with the connections then reversed and the oscillograph adjusted for the zero current position near the sprocket-holes instead of near the picture-record, as shown in Figure 1, will produce a negative in which the crests near the edge of the film will follow approximately a straight line. The shift of the mid-point of the successive undulations with changing amplification, being in the opposite sense when the connections to resistor 39 are reversed, the average degree of darkening of the negative, as a whole, now decreases instead of increasing with faint sounds.

I have shown and described only one form of my invention and mentioned only a few modifications. It will, however, be apparent to those skilled in the art that many other modifications are possible. Accordingly, the omission of specific mention of such modifications is not to be regarded as a limitation. No limitations are intended except those stated in the claims or required by the prior art.

I claim as my invention:

1. In a sound-recording system, an amplifier, including a vacuum tube, means for impressing a potential varying at sound frequency upon the grid thereof, means controlled by the intensity of the sound for impressing a slowly varying potential upon said grid, a recorder including a member moved by the output of said amplifier and means responsive to the said slowly varying potential for controlling the mean position of said member.

2. In a system for reproducing sound from a photographic sound record, a photo-cell the illumination of which is controlled by said record, a circuit in which the current is controlled by said photo-cell, a vacuum tube, means for impressing potential corresponding to the sound-frequency variations of current in said circuit upon the grid of said vacuum tube, and means for impressing a biasing potential upon said grid which varies in accordance with the variation in the average illumination of said photo-cell.

3. A photographic sound record having variations in darkening corresponding to audio-frequency, the amplitude of said variations bearing a ratio to the amplitude of the corresponding sound, which ratio is different at different parts of the record, and the average amount of darkening corresponding to said ratio at each part of the record, whereby the average degree of darkening is correlated to the average intensity of the corresponding sound.

4. The method of reproducing a sound program which consists in translating the sound into electrical pulses, amplifying said pulses to produce amplified current pulses and superimposing said current pulses on a relatively steady current, controlling the degree of amplification of said pulses to cause a greater degree of amplification for faint sounds than for loud sounds, so modifying the amplitude of said relatively steady current that the sum of said steady current and the maximum value of said current pulses is an approximately constant value, forming a single record of the variable area type in accordance with said sum, controlling an energy output in accordance with said record, amplifying the variations in said output corresponding to said impulses, controlling the degree of amplification in accordance with the amplitude of said relatively steady current as recorded on said record to cause a smaller degree of amplification for faint sounds than for loud sounds, and translating said amplified energy variations into sound.

5. The method of producing a sound record which consists in translating the sound into electrical impulses, amplifying said impulses to produce amplified current pulses and superimposing said current pulses on a relatively steady current, controlling the degree of amplification of said pulses to cause a greater degree of amplification for faint sounds than for loud sounds, so modifying the amplitude of said relatively steady current that the sum of said steady current and the maximum value of said current pulses is an approximately constant value, and forming a record of the variable area type in accordance with said sum.

6. A translating system comprising means for impressing the record of a physical phenomenon on a permanent medium, said record being of the type in which the darkened area of the negative accords with the instantaneous values of said phenomenon and in which the area has peaks corresponding to the intensity of said phenomenon, and means responsive to said phenomenon for so varying the mean position of that boundary line of the record which is defined by said peaks that the tops of said peaks attain substantially a common level.

7. In translating apparatus of the type incorporating means for transforming a mechanical disturbance into an electrical disturbance and means for impressing a record of said electrical disturbance on a permanent medium, said electrical disturbance being microscopic in character, said record being of the type in which the darkened area in the negative accords with the instantaneous value of said electrical disturbance and in which said area has peaks corresponding to the intensity of said electrical disturbance, means for introducing a microscopic variation in said electrical disturbance, said electrical disturbance and said microscopic variation being so related that the tops of said peaks are at substantially a constant level.

8. Sound-recording apparatus comprising means for transforming sound energy into electrical energy, means for varying the amplitude of the electrical energy of said transformed sound, means for impressing a record of said electrical energy on a permanent medium, said record being of the type in which the darkened area of the negative accords with the instantaneous values of said electrical energy and in which the area has peaks corresponding to the amplitude of said electrical energy, and means responsive to said amplitude for varying the mean position of that boundary line of the record which is defined by said peaks.

9. Sound-recording apparatus comprising means for transforming sound energy into electrical energy, means for impressing a record of said electrical energy on a permanent medium, and means for varying the zero boundary of said record in accordance with the amplitude of said impressed sound energy.

10. A photographic sound record in which the negative has variations in darkening corresponding to audio-frequency, the amplitude of said variations bearing a ratio to the amplitude of the corresponding sound, said ratio being larger for small sound amplitudes than for large sound amplitudes, and the average amount of darkening increasing with the increase in said ratio.

11. Apparatus for reproducing sound from a positive corresponding to the negative described in claim 10 comprising a photo-cell, an amplifier, means for passing light through said positive onto said photo-cell, and means for decreasing the amplifying ability of said amplifier in response to an increase of the average amount of light falling on said photocell.

12. A sound record of the variable density type comprising regions of darkness interspaced with background regions of lesser darkness characterized by that the average intensity of the background regions varies in accordance with the intensity of the sound recorded.

13. A translating system comprising means for impressing the record of a physical phenomenon on a permanent medium, said record being of the type in which the darkened area of the negative accords with the instantaneous values of said phenomenon and in which the area has peaks corresponding to the intensity of said phenomenon, and means responsive to said phenomenon for varying the mean position of the zero boundary of said record in accordance with the amplitude of said physical phenomenon.

14. Apparatus for photographically recording sound on a moving sensitive film comprising means for directing on the film a variable light beam, and means for supplying to said means for the control thereof an alternating current corresponding to the sound waves to be recorded and a direct current in response to the sound.

15. Apparatus for photographically recording sound on a moving sensitive film comprising means for directing a variable light beam on the film, and means for supplying to said means an alternating current corresponding with the sound waves to be recorded and a direct current variable in accordance with said sound waves.

16. Apparatus for photographically recording sound on a moving sensitive film comprising means for directing a variable light beam on the film, and means for supplying to said means an alternating current corresponding with the sound waves to be recorded and a superposed rectified component of said current.

17. Apparatus for photographically recording sound on a moving sensitive film comprising means for directing a variable light beam on the film, and means for supplying to said means an alternating current corresponding with the sound waves to be recorded, means for modifying the response of said first mentioned means to said alternating current in accordance with a rectified component of said current.

18. In combination, means adapted to continuously expose a light sensitive surface to the action of a beam of light, sound controlled means for influencing said light, means for driving a direct current proportional to the crest amplitude of said sound, and a means whereby the direct current may be independently utilized to further influence said light.

19. In combination, means adapted to continuously expose a light sensitive surface to the action of a beam of light, sound controlled means for influencing said light, means for deriving a direct current proportional to the crest amplitude of said sound, and a means whereby the direct current may be independently utilized to further influence said light.

20. The method of recording sound which comprises moving a photographic medium at uniform speed past a source of light, adjusting the light from said source incident on said medium so that in the absence of sound the opacity of the impression produced in said medium is a minimum, controlling the light from said source so that the average opacity of the impression produced in said medium will vary with the envelope of the volume variations of the sound to be recorded and simultaneously controlling the light from said source so that the opacity of the impression produced in said medium will vary with the instantaneous variations of the sound.

21. The method of recording sound which comprises moving a photographic medium at uniform speed through a beam of light, controlling said beam of light to cause the average opacity of the impression produced in said medium to vary directly with the envelope of the volume variations of the sound to be recorded and simultaneously controlling said beam of light to cause the opacity of the impression produced in said medium to vary with the variations of the sound.

22. The method of recording sound which comprises moving a photographic medium at uniform speed past a source of light, adjusting the quantity of light from said source incident on said medium so that in the absence of sound the opacity of the impression produced in said medium is a minimum controlling the quantity of light from said source so that the average opacity of the impression produced in said medium will vary with the envelope of the volume variations of the sound to be recorded and simultaneously controlling the quantity of light from said source so that the opacity of the impression produced in said medium will vary with the instantaneous variations of the sound.

23. The method of making a photographic sound record adapted to produce a minimum amount of ground noise upon the reproduction of the recorded sound which comprises exposing a sensitive film to a light beam, varying the beam in accordance with the wave form of the sound being recorded and varying the zero of the beam in accordance with the volume of the sound.

24. The method of making a variable area photographic sound record in which the clear area varies with the volume of the sound being recorded which comprises exposing a sensitive film in motion to a light beam, vibrating the beam in a direction transverse to the direction of motion of the film in accordance with the wave form of the sound being recorded, and producing a lateral displacement of the zero modulation position of the beam in accordance with the volume of the sound.

25. A film having a sound track containing a variable area photographic record of sound waves the line of zero modulation of the record varying in position relative to one side of the sound track in accordance with the volume characteristic of the recorded sound.

26. A film having a sound track containing a variable area photographic sound record the peaks of the opaque portion of the record extending substantially to one boundary of the sound track irrespective of variations in the volume of the recorded sound.

27. A film having a sound track containing a sound record which record comprises relatively clear and opaque portions bounded by the respective opposite sides of the sound track, the line of zero modulation of the record receding from the side of the sound track which bounds the clear side of the record in accordance with the volume of the recorded sound.

28. Apparatus for making a variable area photographic sound record in which the area of the clear portion thereof varies approximately with the sound volume including means for directing a light beam on a moving light sensitive film and means for vibrating the beam in a direction transverse to the direction of motion of the film in accordance with the sound waves to be recorded and for producing an additional displacement of the beam in the direction of the vibration in accordance with the volume of the sound.

29. Apparatus for photographically recording sound on a moving sensitive film comprising a source of light, means for directing a light beam therefrom on said film and for vibrating the beam transversely to the direction of motion of the film in accordance with the sound to be recorded, and sound responsive means for shifting the zero modulation position of said beam in the direction of the vibration.

30. Apparatus for photographically recording sound on a moving sensitive film comprising a source of light, means comprising an oscillograph galvanometer for reflecting a light beam from said source on said film and for vibrating it in accordance with the sound waves to be recorded to form a variable area sound record, and means responsive to said sound waves for shifting transversely of the direction of motion of the film the zero modulation position of the vibrated light beam.

31. Apparatus for photographically recording sound on a moving sensitive film comprising a light source, an oscillograph galvanometer arranged to have a light beam from said source projected thereon and to project a resultant beam on said film, means for impressing an alternating current corresponding to the sound to be recorded on said galvanometer to vibrate it accordingly and to form a variable area sound record on said film, and means responsive to said sound for superposing a direct current on the alternating current input of said galvanometer.

32. Apparatus for photographically recording sound on a moving sensitive film comprising a light source, an oscillograph galvanometer arranged to have a light beam from said source projected thereon and to project a resultant light beam on said film to form a variable area sound record on said film, and means for supplying to said galvanometer an alternating current corresponding to the sound waves to be recorded, and a superposed rectified component of said current.

33. Apparatus for photographically recording sound on a moving sensitive film comprising a light source, an oscillograph galvanometer arranged to have a light beam from said source projected thereon and to project a resultant light beam on said film to form a variable area sound record on said film, a sound current amplifier actuated by said sound having a connection with said galvanometer, and rectifier means in said connection for superposing on the alternating sound-responsive current supplied to the galvanometer a direct current controlled by the sound being recorded.

34. In combination, a source of sound modulated waves, a photographic medium moved at constant speed, a source of electric current, a light source, an optical system focusing the light from said light source on said medium, a circuit connecting said light source to said source of electric current, means for varying the current in said circuit in accordance with the instantaneous variations in said waves and an impedance in said circuit varied in accordance with the envelope of the amplitude variations in said waves in such manner that the average current flow through said light source corresponds to said envelope.

35. In combination, a source of sound modulated waves, a photographic medium moved at constant speed, a source of electric current, a light source, an optical system focusing the light from said light source on said medium, a circuit connecting said light source to said source of current, means for producing a current in said circuit varying in accordance with the instantaneous variations in said waves and an impedance element in said circuit varied in accordance with the envelope of the amplitude variations in said waves in such manner that the average current flow through said source corresponds to said envelope.

36. In combination, a source of sound modulated waves, a photographic medium moved at constant speed, a source of electric current, a light source, an optical system directing the light from said light source on said medium, a circuit connecting said light source to said source of current, means for producing a current in said circuits in accordance with the instantaneous variations in said waves and an impedance element in said circuit to reduce the current in said circuit to a small value in the absence of sound modulated waves and to increase the current in said circuit in accordance with the envelope of the amplitude variations in said waves.

37. In combination, a source of sound modulated waves, a photographic medium moved at constant speed, a source of electric current, a light source, an optical system directing the light from said light source on said medium, a circuit connecting said light source to said source of current, means for producing a current in said circuit varied in accordance with the instantaneous variations in said waves, an impedance element in said circuit and means energized by said waves to vary said impedance element in accordance with the envelope of the amplitude variations of said waves in such manner as to vary the average current flow through said light source in accordance with said envelope.

CLINTON R. HANNA.